J. P. Pirsson,
Steam-Boiler Condenser.
N° 7,250. Patented Apr. 2, 1850.
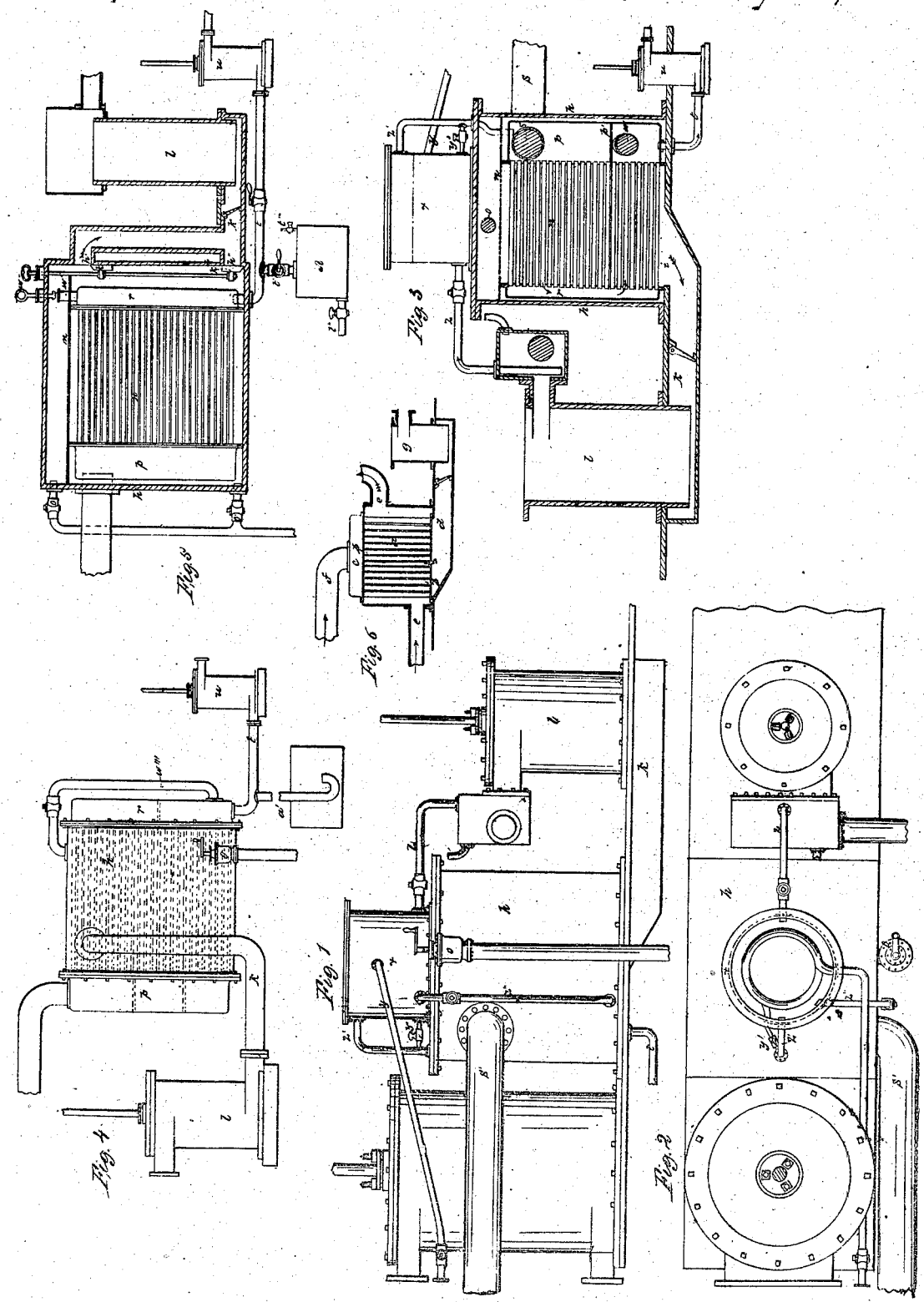

UNITED STATES PATENT OFFICE.

JOSEPH P. PIRSSON, OF NEW YORK, N. Y.

IMPROVED SURFACE-CONDENSER FOR STEAM-ENGINES.

Specification forming part of Letters Patent No. 7,250, dated April 2, 1850.

*To all whom it may concern:*

Be it known that I, JOSEPH P. PIRSSON, of the city, county, and State of New York, have invented a new and useful Apparatus for Condensing Steam; and I do hereby declare the following to be a full, clear, and exact description of the same, reference being had to the annexed drawings, making a part of this specification, in which—

Figure 1 is a side elevation. Fig. 2 is a top view. Fig. 3 is a longitudinal section. Figs. 4 and 5 are views showing variations in the construction of the same apparatus. Fig. 6 is a view of a common condenser.

Similar letters refer to similar parts unless specially noted to the contrary.

My invention consists in certain improvements in condensers for steam-machinery, whereby the boilers used for generating the steam shall be supplied with pure water, or water freed from saline or other foreign substances.

To condense steam to water it must be brought in contact with some element of less temperature than itself, and the extent and rapidity with which it can be effected will be as the difference of temperatures and the conducting quality of the condensing element. The usual modes of condensing steam, where it is used as a motive power, are by allowing it to escape into the air, by injecting it into a vessel or vessels which are kept at a low temperature by immersion in cold water or a current of air, the steam being cooled by contact with the metal, and by injecting it into vessels in which it is brought in direct contact with a jet of water. In the first instance the water resulting from the condensation of the steam is lost. In the second it is retained in the vessel in which it is confined, unmixed with any other substance. In the third it is retained, but is mixed with the water used for condensing it. Condensing-engines are those which employ one or the other of the two last-described plans. In marine-engines, or where salt or other impure water is employed for condensing the steam, this latter plan involves the loss of the fresh water, resulting therefrom in a manner well known, and consequently either the boilers must be supplied with bad water or a supply of pure water must be specially provided. In most cases this cannot be accomplished, as it has been found impossible to carry a sufficient quantity to last for any great length of time. This being the case, attention was early (in the history of the steam-engine) given to perfecting the second mode named herein—viz., the condensing of the steam by radiation in closed metallic vessels kept submerged in water. In this plan the boilers are to be first filled with pure water. The steam, being condensed back to water, is thus caught and returned to the boilers, to be used over and over again, the leakage and waste being supplied from reservoirs provided with an extra quantity, or by distillation. The steam being condensed *in vacuo*, the external surfaces of these vessels are thereby subjected to the pressure of the atmosphere, and also to the pressure of a column of water proportioned to the depth at which they are immersed.

In Fig. 6 is a view of the usual mode of constructing this kind of condenser. $a$ is a cluster of pipes (that being the best form to resist pressure) inserted in two flanges, $b$. The ends of the pipes are covered at $c$ by a cap, and at $d$ by the channel in the bed-plate. $e$ is a tank to hold the water for condensing, which flows in and out, as indicated. $f$ is the exhaust-pipe for conveying the steam to be condensed; $g$, the air-pump. The steam is thus condensed by coming in contact with the cold surface of the metal, the pump $g$ maintaining the vacuity of the pipes by removing the water as fast as it accumulates in the channel $d$, and also any air or other gases; hence the external surfaces of the tubes are subjected to the pressure of the air, and also to that of the column of water in which they are immersed, as before named. This mode of condensing steam has these difficulties to contend with, and which have been found insuperable. The alternate heating and cooling of the metal pipes, consequent upon the periodic injections of the steam, causes a series of expansions and contractions to be continually going on. In addition to this, the great pressure upon them soon produces fractures in the various joints and seams, which at once destroys the whole operation, as the vacuum can no longer be maintained from the flowing in of the air and also of the water, which is fatal to the whole operation.

Having thus stated the peculiar character of the old modes of condensing steam, I shall now proceed to describe my improvements and to set forth wherein they differ from all others.

At the letter $h$ is represented a box or case composed of metal, and of sufficient strength to resist the pressure of the atmosphere, and is also to be made as perfectly air and water tight as possible. In the under side of the box $h$ there is an opening, $i$, through which a connection is made by a pipe or channel, $k$, with an air-pump, $l$, of common construction, as shown in section, Fig. 3. At $m$ is a perforated plate on which the condensing-water is received, and is for the purpose of dispersing it in a manner well known. At $o$ a pipe and cock are attached for injecting the water for condensing the steam. Into the box thus constructed I next introduce a radiating-condenser—that is to say, a vessel or apparatus in which steam is to be condensed by contact with cold metallic or like surfaces—which I make as follows:

At $n$, Fig. 3, is seen a number of pipes arranged horizontally, their ends being fixed in plates or flanges of metal having holes perforated to receive them. Next, I cover the ends of the tubes by attaching caps $p$ and $r$ to these plates, as shown in section, Fig. 3. The tubes thus arranged are introduced within the box $h$, as shown. In the cap $p$ there is an opening made at $s$ to receive the end of the pipe which conveys the steam to be condensed, which pipe is seen at $s'$. The steam-pipe $s'$ is bolted to the outside of the box $h$ by a flange, the end passing through and made to enter the cap $p$ through the hole $s$, as shown. The cap $p$ is divided into two compartments by a partition, $p'$, the object of which is to cause the steam to traverse through two sections of pipes. More partitions may be introduced to insure full and equal distribution of the steam to each pipe.

At $t$ is shown a pipe connected with the lower side of the cap $p$, which passes through the box $h$, having a tight joint where it comes out. This pipe terminates in a pump, $u$, the use of which is to pump away the water resulting from the condensation of the steam, and which collects in the bottom of the pipes and caps.

At $w$ is an opening in the lower division of the cap $p$, which forms a passage from the pipes to the interior of the box, the use of which will be described more fully. This opening $w$ is to have a door or valve over it of common construction, which may be opened or closed by a handle from the outside of the box $h$, the handle working through a stuffing-box in $h$.

I have described this part of my invention as being made of tubes or pipes chiefly, but it is obvious that other forms may be substituted—as sheets of metal, coils of pipe, &c.

The operation of this part of my invention is as follows: The engine being started in the usual manner, the exhaust-steam flows through the pipe $s'$ into the cap $p$, and thence into the cluster of pipes $u$. At the same time a jet of cold water is admitted through the injection-cock $o$ on the perforated plate $m$, from which it falls in a shower upon the pipes $n$, and thus, by a well-known law, at once condenses the steam, the water resulting being collected in the bottom of the pipes and caps, the large pump $l$ removing the condensing-water as fast as it accumulates from the box $h$ and maintaining the vacuum, the smallest pump $u$ removing the water resulting from the condensed steam in like manner. The condensing-water is allowed to flow off as fast as discharged from the pump $l$, but the water taken from the pipes is retained for the feed to the boilers. The use of the aperture $w$ is for the purpose of maintaining an equal pressure on each side of the pipes, or rather to prevent them from being subjected to any pressure either internal or external. This can be made apparent as follows: Supposing the orifice $w$ closed and cold water admitted in quantity sufficient to condense a part of the steam only, it will be evident that the vacuum in the box $h$ will be better than the vacuum in the pipes, and the difference will be as the volume of uncondensed steam. Now, if we open the door or valve over the aperture $w$, a portion of the steam in the pipes will at once rush through and extend itself throughout the box $h$ until an equilibrium is produced. So long as the steam is fully condensed, and also the operation of the pumps $l$ and $u$ equal, then of course the radiating-condenser $n$ will be subjected to the same pressure, both external and internal, or rather will not be subjected to any, even if the orifice $w$ be kept closed. The use of the opening $w$, therefore, is to insure the preservation of the equilibrium in cases where the steam is not fully condensed, or where the pumps fail to work equally, the atmospheric pressure being sustained by the box $h$.

Having now described the principal elements of my condensing apparatus, except some of its modifications, (to be mentioned hereinafter,) I will next describe an apparatus for making up any deficiency in the supply of pure water which may arise from leaks and other means of waste.

At $x$, Figs. 1, 2, 3, is seen a tank standing upon the top of the condensing-box $h$, (but may be put in any other convenient place.) This tank must be air and water tight, and also capable of sustaining the pressure of the atmosphere.

At $y$ a steam-pipe is attached, which may terminate on the inside in a coil or cluster of pipes or other chamber for holding steam, as shown. The lower end of this coil terminates in a pipe which passes out through the side of the tank at $y'$, and empties into another pipe, as shown.

$z$ is a pipe attached to the lower side of the tank $x$, the opposite end of which terminates in the "hot well" of the air-pump $l$ or other reservoir containing a supply of the water to be evaporated.

$z'$ is a pipe attached to the upper side of the tank $x$. It is bent so as to pass down through the top of the box $h$, to which it is bolted by a flange, the end terminating so as to discharge into the cap $p$ of the inside condenser, as shown.

$z''$ is a pipe attached to the tank $x$, near its bottom, by one end, and by the other to the box $h$, so as to discharge into it. To put this apparatus in operation, the engine is first set in motion, and the condensation of the steam going on, the vacuum of the box $h$ will be communicated through $z'$ to the tank $x$, the interior of which will consequently be *in vacuo*. The cock in the pipe $z$ being opened, water from the hot well of the pump $l$ will flow into $x$ by the pressure of the atmosphere. The tank is to be filled sufficiently to cover the coil of pipes, or as seen at the dotted lines. Next, steam is to be admitted through $y$, the cock $y'$ being kept closed, (except when it is necessary to draw off the water which may collect from the condensation of steam in this place.) By this means the water in $x$ will be vaporized, the vapors being drawn off as fast as it rises through the pipe $z'$ into the condenser's cap $p$, and there condensed along with the exhaust-steam from the engine, so that it serves to make up for the loss by leakage, &c., of the first supply. As this apparatus is of use only where the water for generating the steam is impure or salt, some mode is required for keeping the tank $x$ clear of the deposit of these impurities, as by evaporation all these must collect in the evaporating-vessel, according to laws well known. To remedy this, I connect the evaporating-vessel with the box $h$ by a pipe, $z''$, said pipe entering the evaporator near its bottom, and discharging into box $h$, as shown. A cock or valve is also fitted into said pipe to regulate the rate of discharge, which takes place by gravity alone. As the two vessels are alike *in vacuo*, the saturated water will flow through the pipe $z''$ in the same manner as if $x$ and $h$ were both open vessels. If the supply for waste is to be made up from salt-water, as in sea-going steamers, then a certain quantity of this water must be taken out of the tank by this pipe proportionate to the quantity evaporated, and thus the amount fed through the pipe $z$ must be sufficient for both the evaporation and the quantity thus drawn off. The same rule applies to evaporating water containing lime or any other impurity. The water taken off through $z''$ enters the box $h$ and is pumped out with the condensing-water by the air-pump $l$.

In Fig. 5 is a view of a modification of the condensing apparatus, the same letters referring to the same parts, except when otherwise indicated. This is to show a mode whereby the radiating or surface condenser may be immersed in the condensing-water, or showered at pleasure, and exhibits, also, a variation whereby the pump removing the water resulting from the condensed steam may be dispensed with. In this case, when the pipes or other surfaces, $n$, are immersed in the water, they are subjected to the pressure of the same in a greater or less degree according to its depth; but they are not subjected to the pressure of the atmosphere in addition, as will be shown. $h'$ $h''$ represent two openings in $h$, connecting the air-pump $l$ by the channel $k$. $k'$ $k''$ are valves for closing the openings $h'$ $h''$, operated from the outside of the box $h$, as shown. If the pipes $n$ are to be used submerged, the valve $k''$ must be closed and valve $k'$ opened. The condensing-water, being let on through $o'$, fills up the box $h$ until the water is on a line with the opening $h'$, and thus the pipes are immersed. If the pipes are to be showered instead, then $k''$ must be opened and the condensing-water let on through $o$ onto the plate $m$, in the manner before described. When this plan is adopted, the aperture for insuring the equilibrium must be placed in such a situation that the condensing-water cannot enter the pipes. In Fig. 5 it is shown at the pipe $w'$, and $w''$ is the stop or valve for opening or closing it.

The next feature is a method of dispensing with the pump $u$.

A is a tank, air and water tight, and capable of sustaining the pressure of the atmosphere. This is to be connected to $t$ by a pipe, with a valve or cock intermediate, as $t'$.

At $t''$ is a delivery-cock. At $t'''$ is an air-cock. The pump $u$ being disconnected, $t'$ is to be opened, and thus communication is made between the tank A and pipes $n$, as plainly shown, $t''$ and $t'''$ being closed always when $t'$ is opened. The water from the condensed steam will now descend by its gravity into A. When A is full, $t'$ must be closed, $t''$ and $t'''$ opened, which permits the water in A to run out, being collected in reservoirs, from which the boilers are to be fed. As soon as A is empty, close $t''$ $t'''$ and open $t'$ until again filled, and so on. The periodic opening and closing of these valves or cocks can be easily arranged to be operated by the works themselves.

Fig. 4 exhibits another arrangement, embodying, however, the same general principles. The same letters are used to represent similar parts described in the other figures. The principal variation in the construction of this part of my invention consists in forming the box $h$ so that the tubes $n$ shall be inserted in the two opposite sides, as shown in the dotted lines. In that case the caps $p$ and $r$, to cover them, are placed outside. The injection-cock $o$ is placed at the bottom and the delivery-pipe $k$ at the top, so that the pipes are shown as immersed in water, but may be showered by making the changes before described. $w'''$ represents a pipe forming a communication with the box $h$ and the interior of the pipes $n$, for keeping the pressures equal, and equivalent to the aperture $w$ in Fig. 3, or $w'$ in Fig. 5. Another variation consists in the manner of removing the water of the condensed steam, the same principle being applicable to removing the condensing-water also. The pump $n$ being taken off, a pipe, $a'$, is substituted, which is attached to the cap $r$, where the water from the condensed steam accumulates. This pipe must have a descent vertically sufficiently great to cause the column of water to counterbalance the atmospheric pressure—say of thirty-four feet—and may terminate in a reservoir. By this means the gravity of the water will overcome the vacuum in the pipes, and thus deliver itself without other mechanical aid.

Having thus set forth the several modes in which I contemplate constructing, operating, and applying my invention, I will state wherein it differs from all others, and the advantages to be derived from the same.

First. By arranging the radiating or surface condenser so that it is not subjected to the pressure of the atmosphere.

Second. By reason of which arrangement the apparatus is not so liable to be destroyed by the great pressure it would otherwise have to sustain; therefore durability and safety is increased.

Third. Small leaks and fractures will not affect its operation, the box $h$ being exhausted of air or other uncondensible gases, which are not therefore present to flow through such apertures, and the condensing-water will not enter, because there is no external pressure upon the pipes to force it in. The water falling upon the pipes by gravity alone, its tendency will be to run out rather than in. Thus, where salt or other bad water is used for condensing, no admixture with the pure water of the condensed steam will take place.

Fourth. Increased safety, as the whole surface-condenser might be destroyed in the box $h$ without impairing the working of the engine or even arresting its motion. The only change perceivable would be the loss of fresh water resulting from the condensed steam. This is a most important feature for sea-going steamers.

In the foregoing specification I have described the apparatus arranged generally so that the condensing-water is applied to the exterior surface of the pipes or radiating-condenser; and although I prefer this plan, yet a slight change can be made, whereby the condensing-water shall be applied on the inside of the pipes or surface-condenser, and the steam injected in the box $h$; the pumps $l$ and $u$ being in that case transposed to suit the arrangement.

What I claim as my invention, and desire to secure by Letters Patent, is—

1. The combination of a surface or radiating condenser with a box or case in such a way that the condensation of the steam shall be effected therein without subjecting the said radiating-condenser to atmospheric pressure, in the manner described.

2. The aperture $w$, or its equivalent, for maintaining the equilibrium and as a passage for any steam which may remain uncondensed in the radiating-condenser, in the manner set forth.

3. Connecting the evaporator with the chamber $h$, substantially in the manner described, whereby I am enabled to draw off the saturated water from the bottom of the evaporator.

JOSEPH P. PIRSSON.

Witnesses:
S. H. MAYNARD,
THOMAS H. WOOD.